S. G. MORRISON.
Emery-Wheel.
No. 163,025.  Patented May 11, 1875.
Fig. 1.
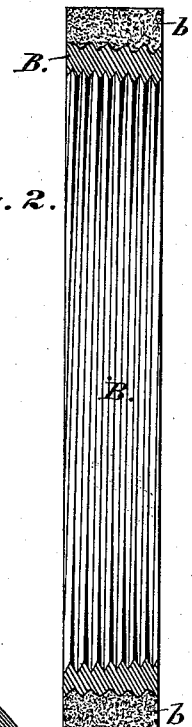
Fig. 2.
Fig. 3.
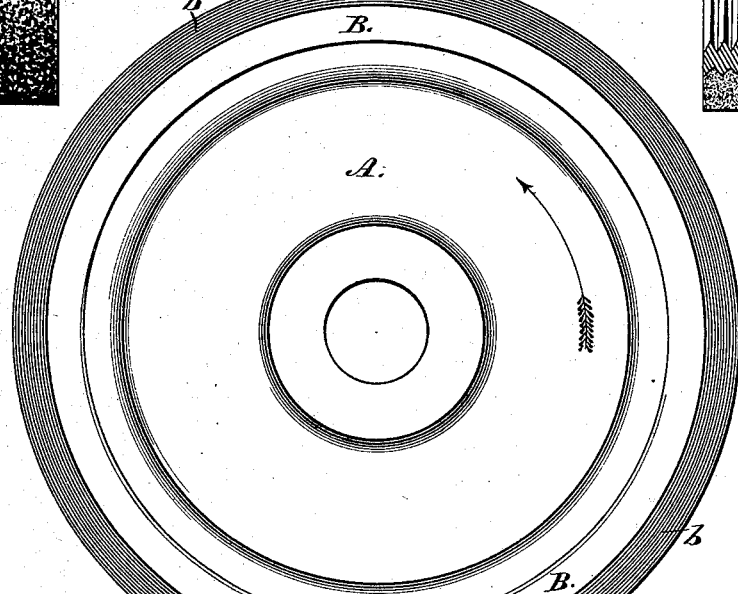
Witnesses:
Hepburn M'Clure
H. T. Ames
Inventor:
Samuel G. Morrison

UNITED STATES PATENT OFFICE.

SAMUEL G. MORRISON, OF WILLIAMSPORT, PENNSYLVANIA.

IMPROVEMENT IN EMERY-WHEELS.

Specification forming part of Letters Patent No. 163,025, dated May 11, 1875; application filed August 18, 1874.

*To all whom it may concern:*

Be it known that I, SAMUEL G. MORRISON, of Williamsport, Pennsylvania, have invented an Improvement in Emery-Wheels, of which the following is a specification:

The object of my invention is to form an emery grinding-surface upon a wheel for grinding steel and other hard substances. I construct a wheel of suitable material, (usually of iron,) of any required thickness and diameter. The surface of the periphery of the wheel is slightly beveled for the purpose of receiving a ring having a corresponding bevel on its inner side, to which is attached an emery baked surface. This ring has corrugations or annular grooves upon the outer surface, and of such size and form as to correspond with the wheel upon which it is applied. To prepare the emery grinding-surface, the ring is centered and fastened in a mold. The emery paste is tamped into the mold to any desired thickness, then pressed and secured in the mold, and baked in an oven heated sufficiently to melt the sulphur. When it is removed from the mold it is ready for use.

This metal ring, carrying the emery grinding-surface, is put over the metal wheel, driven up the bevels on the periphery of the wheel, where it is held firmly by a screw.

The machine is illustrated, in the accompanying drawings, in a plan view, Figure 3.

Letter A marks the metal wheel. Letter B marks the metal ring, with its emery surface $b\ b$. Fig. 2 represents the metal ring with the emery surface $b\ b$ thereon, and Fig. 1 the same, partly in section.

The advantages in my invention consist in the ready and cheap application of emery grinding-surfaces of divers forms to metal wheels, so as always to maintain a diameter corresponding with the revolutions of the wheel, capable of the highest speed without danger of bursting.

I claim—

The combination of the metal wheel A and the metal ring B, with their corresponding bevels, and the emery surface $b\ b$, when used for the purposes substantially as described.

SAMUEL G. MORRISON.

Witnesses:
HEPBURN McCLURE,
H. T. AMES.